UNITED STATES PATENT OFFICE.

LEWIS A. BROWN, OF ST. LOUIS, MISSOURI, ASSIGNOR OF ONE-HALF TO DWIGHT TREDWAY, OF SAME PLACE.

COMPOSITION OF MATTER.

SPECIFICATION forming part of Letters Patent No. 672,351, dated April 16, 1901.

Application filed November 19, 1900. Serial No. 37,043. (No specimens.)

*To all whom it may concern:*

Be it known that I, LEWIS A. BROWN, of the city of St. Louis, State of Missouri, have invented certain new and useful Improvements in Composition of Matter, of which the following is a full, clear, and exact description.

This composition is derived by mixing the following ingredients in about the proportions stated, viz: sand, sixty per cent.; cement, ten per cent.; sulfur, twenty per cent.; lampblack, five per cent.; coloring-matter, five per cent. The process by which these ingredients are mixed consists of the following steps: The amount of sulfur required to form the composition is reduced to a liquid state by means of heat and while in this state the cement, either natural or artificial, is mixed therewith by agitation. The sand is then heated to a temperature of about 500° Fahrenheit in order to remove as much of the impurities as is possible, and while in this condition it is mingled with the cement and sulfur, and the mixing of these ingredients forms a solid mass. This mass is then liquefied by applying a temperature of 750° Fahrenheit, and while in this state the lampblack is put in and the mass is thoroughly agitated in order to mix all the ingredients and to render the composition more porous. The lampblack is not absolutely requisite to the composition and, if desired, may be omitted, in which instance the other ingredients are proportionately increased to maintain their relation to each other. The temperature of about 750° is maintained for about fifteen minutes, and while in this state the pigments are put in to give the desired color and are thoroughly mixed therein in order to make the color uniform. The temperature is then gradually reduced to about 300° Fahrenheit, in which state the mass becomes viscid and in a condition to be poured into any desired mold to form whatever object may be desired. After being placed in the mold the composition is allowed to cool, and after being retained in the mold for a sufficient length of time it may be removed and used for the purpose desired.

The above ingredients mixed in the proportions stated form a frangible substance, which may be used for many purposes, such as for forming bodies of seals, statuary, &c. It may be given any color desired by the application of the coloring-matter in the proportion mentioned.

In a separate application I have set forth the process by which the product is made and have therein pointed out, particularly in the claims, the novel and essential steps to be followed in deriving the product herein described and claimed.

I claim—

1. A composition of matter, consisting of sand, cement, sulfur and lampblack mixed together, substantially as herein specified.

2. A composition of matter, consisting of sand, cement, sulfur, lampblack and coloring-matter mixed together, substantially as specified.

3. A composition of matter, consisting of sand, sixty per cent.; cement, ten per cent.; sulfur, twenty per cent.; lampblack, five per cent.; and coloring-matter, five per cent., substantially as herein specified.

4. A composition of matter, consisting of sand, cement, sulfur and lampblack mixed, together with a suitable amount of coloring-matter, substantially as specified.

In testimony whereof I affix my signature in presence of two witnesses.

LEWIS A. BROWN.

Witnesses:
ALFRED A. EICKS,
JOHN D. RIPPEY.